United States Patent [19]
Yoshikawa et al.

[11] 3,850,573
[45] Nov. 26, 1974

[54] PARISON FEEDING AND DELIVERING APPARATUS

[75] Inventors: Shinsuke Yoshikawa; Yuji Sawa, both of Iwaki, Japan

[73] Assignees: Kureha Kagaku Kogyo Kabushiki Kaisha; Mitsui Toatsu Chemicals Inc., both of Tokyo, Japan

[22] Filed: Aug. 7, 1973

[21] Appl. No.: 386,463

[30] Foreign Application Priority Data
Aug. 10, 1972 Japan.............................. 47-79474
Aug. 10, 1972 Japan.............................. 47-93260

[52] U.S. Cl................................ 432/124, 432/239
[51] Int. Cl............................................. F27b 9/24
[58] Field of Search..................... 432/121, 124, 239

[56] References Cited
UNITED STATES PATENTS
3,477,700  11/1969  Kinslow, Jr. ........................ 432/124
3,740,868  6/1973  Moore et al. ....................... 432/124

Primary Examiner—John J. Camby
Attorney, Agent, or Firm—Sughrue, Rothwell, Mion, Zinn & Macpeak

[57] ABSTRACT

A parison feeding and deliverying apparatus for uniformly heating parisons by delivering the parisons from the outside of a parison heating furnace into a parallel passage arranged in the furnace and lying in a zig zag line making several turns at both sides of said furnace is provided which comprises a parison delivery conveyor consisting of two horizontal endless chains situated one above the other and having parison carrier pins vertically attached thereto, an apparatus provided outside of the heating furnace for feeding parisons to said delivery conveyor, and a plural of sprockets for keeping said endless chains in driven or rotating status.

4 Claims, 7 Drawing Figures

3,850,573

PARISON FEEDING AND DELIVERING APPARATUS

BACKGROUND OF THE INVENTION

The blow molding of synthetic resin to form receptables has previously been performed by two methods, one called the hot parison method which involves forming resin into a tubular or bubble form by an extruder or injection molding machine and blow molding it while it is in the semi-molten state, and the other called the cold parison method which involves forming the resin into a tubular or bubble form, cooling the formed article, again heating it to a semi-molten state temperature or moldable temperature and blow molding it. The latter, the cold parison method, consists of two ways. One is for molding vinyl chloride resin, etc. aiming at the saving the transportation cost of receptables, rationalization of operations by coonnecting the apparatus to the line charging contents into receptables, introducing of in-line processing, increasing the line speed, and the like. In this case, since the heating furnace heats the resin to its molten state, a wide suitable temperature range is obtainable, which enables, for example, such a method as to perform the effective heating by applying a high temperature at the initial stage. The other method is to adapt the called parison method for the biaxially stretching blow molding.

In recent years, the biaxially stretching blow method which comprises heating a parison once quenched to a stretching temperature range, stretching it in the longitudinal direction, and then blow molding it, has been used to form receptacles of vinylidene chloride resin or polypropylene resin in order to improve the physical properties of the product such as falling strength or transparency, as a result of strong stretching and orientation and thus to utilize the inherent properties of the resins more effectively. With polyvinylidene chloride resin, the stretchable and moldable temperature range is near room temperature and, therefore, it is easy to form it continuously into a tubular shape by extruding from an extruder, cool the extrudate, and blow mold it at an elevated temperature. However, in the case of polypropylene or the like whose stretching temperature ranges over 140° – 170° C, that is, near the melting temperature, a continuous method comprising cooling the extruded parison and then heating it to a stretching temperature requires a large-sized apparatus, and it is not feasible. It is, therefore, necessary to cool the parison, but it to a predetermined length and then heat it by an additional method, for example, by heating it in a blast heating furnace. Such heating furnace must satisfy a stringent requirement that the resin should be fed at a predetermined narrow temperature range in the vicinity of but below the melting point and that it should be heated uniformly.

SUMMARY OF THE INVENTION

The object of this invention is, therefore, to provide a delivery conveyor, for use with the process heating tubular parisons of synthetic resin cut to a predetermined length to a predetermined temperature in a heating furnace and blow molding them, which is characterized by engaging said parisons to parison carrier pins and delivering the same rotation in the furnace and thus uniformly heating the parisons through the smooth delivery thereof.

This invention to be applied to the foregoing biaxially stretching blow mold method, provides a parison delivery conveyor which continuously delivers parisons with rotation through a furnace that comprises two divisions consisting of a temperature elevating division and a temperature equalizing division, all of the parisons being conveyed on the same passage, always at a constant speed and without rolling thereby enabling all of the parisons to be uniformly heated by the blast air.

The parison delivery conveyor is composed by providing two endless chains situated one above the other which continuously proceed through a furnace for heating the parisons while making several turns and communicate with a parison feeder, vertically mounting connection pins on both of the chains at every several pitches, engaging at the top of each pin a parison carrier pin for vertically supporting tubular parison with sufficient clearance for the ventilation and connecting a sprocket or gear to said parison carrier pin so as to freely rotate it. On engaing parisons successively to such parison carrier pins, they are continuously delivered to the furnace. The two divisions in the furnace include a parallel passage along which the delivery chains situated one above the other proceed while making several turns, where guide plates which prevent the chain rolling and chains or racks which rotate the parison carrier pins are fixedly secured on the sides. Thus, when a parison carrier pin is conveyed to the fixed chain or rack, a sprocket or gear provided to said parison carrier pin engages with them and the parison is delivered with rotation thereby being uniformly heated through its circumference. A fixed coil spring is located 1–3 pitches before the engaging position of linear fixed teeth such as a chain, rack, etc., and rotating teeth of the parison carrier pin such as a sprocket or gear so that they may properly engage to each other without damage by excess forces that would otherwise be excerted on them caused from the immoderated engagement. If the long chains which make several turns in the furnace are driven from only one point, mechanical resistance of the chains increases and thermal elongation in the chains becomes greater to cause troubles such as rolling, etc. In the apparatus of this invention, sprockets on one of the turning sides of the chains are respectively connected with gears and the like and driven and all of the sprockets on the other side are pulled by way of springs thereby decreasing the tension excerted on the chains and easily absorbing thermal elongation. In the delivery chains thus arranged, parisons, while delivered continuously, are rotated at predetermined positions, heated to a predetermined temperature through the furnace and, on coming out of the furnace, extracted upwardly from the parison carrier pins by another parison take out apparatus and then delivered to the next stage. Unloaded parison carrier pins proceed again below the parison feeder and are fed with successive parisons. An embodiment of this invention will now be described in detail referring to the accompanying drawings which only illustrate one preferred embodiment of this invention.

BRIEF DESCRIPTION OF THE ACCOMPANYING DRAWINGS

DESCRIPTION OF THE PREFERRED EMBODIMENT

Figure 1:
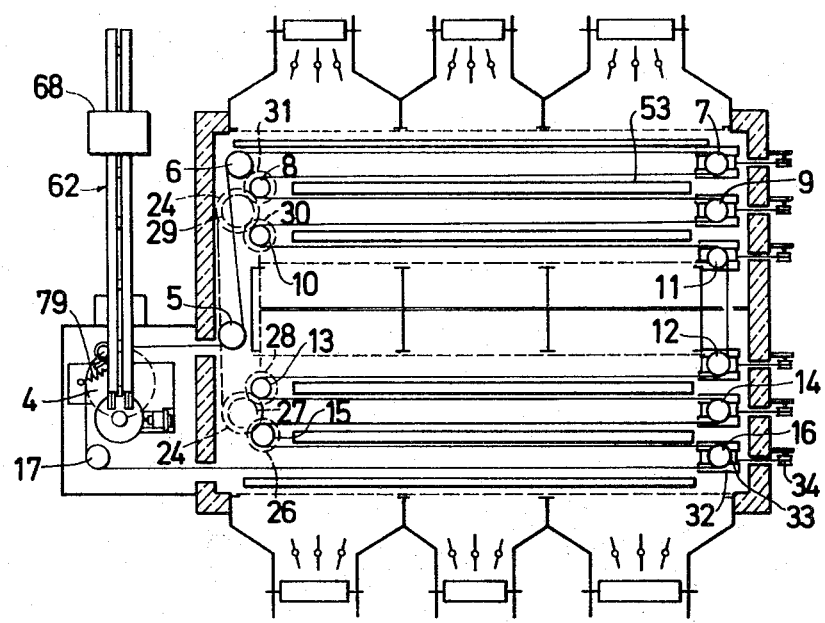
FIG. 1 is a plan view schematically showing an apparatus of this invention.

Endless chains 2, 2' which deliver parisons 1 travel inside and outside of the furnace 3 continuously at a constant speed while guided by two rows of sprockets 4, 5, . . . ., 17. The power for driving the chains is transmitted from a motor 18 through a belt 19 and reduced in speed by a retarder 20 to a predetermined speed and then transmitted from a sprocket 21 to a sprocket 22 to drive a rotating shaft 25 of the sprocket 4. While on the other hand, the power is also transmitted from a sprocket 23 to a sprocket 24 and drives sprockets 13 and 15 through gears 26, 27 and 28 and drives sprockets 8 and 10 through gears 29, 30 and 31. Each of sprockets 7, 9, 11, 12, 14 and 16 is mounted on a sliding plate 33 supported by a guide means 32. Said sliding plate 33 is attached with a wire 36 that is guided along rollers 34 and 35 and secured with its top a spring 37. Thus the sliding plate is pulled with a predetermined tension by a bracket 38, bolt 39 and a nut thereby decreasing the tension excerted on deliver chains 2, 2' so as to prevent torsion due to the thermal expansion and severe tension.

Figure 3:
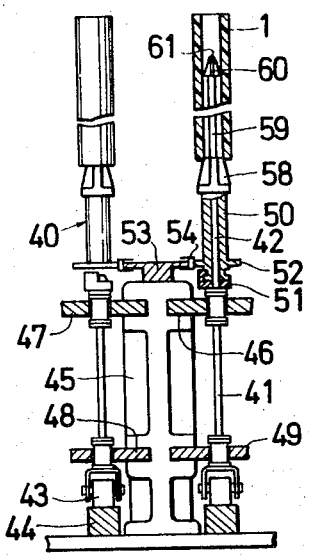
FIG. 3 is a detailed sectional view showing a parison carrier pins and a part of parison delivery conveyor.
Figure 4:
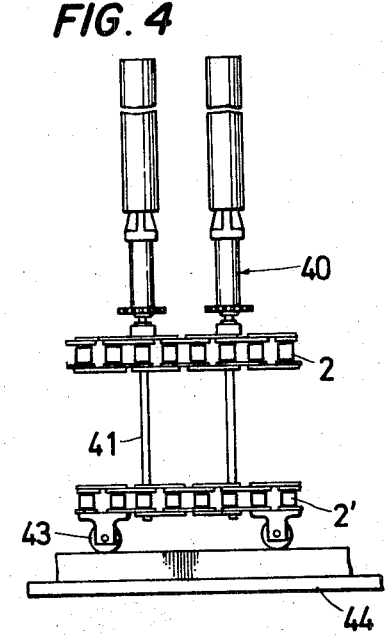
FIG. 4 is a side view of a parison carrier pins and a part of the parison delivery conveyor shown in FIG. 3.
Figure 5:
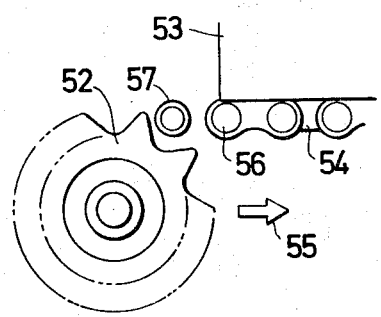
FIG. 5 is an illustrative view showing an improved engaging mechanism between the sprocket of a carrier pins and a fixed linear rack.

The detail structure of the deliver chains 2, 2' and that of the parison carrier pins 40 are to be described below. As shown in FIGS. 3 and 4, two chains situated on above the other which travel transversely are connected by vertically mounted pins 41 arranged at a distance several pitches of the drain and provided with upwardly projecting axis 42. On the lower chain rollers 43 running on rails 44 are mounted at a spacing of several pitches so as to prevent the sag of two chains 2, 2' caused by its dead weight. Between chains 2, 2', stands 45 are provided at several positions for preventing the rolling of the chains and hold rails 46, 47, 48 and 49 supported by said stands hold the upper and lower chains 2, 2' at the left and right respectively. Thus, the chains can be delivered with little pitching and rolling and under the reduced mechanical resistance in spite of its extremely simple structure. A parison carrier pin 40 is engaged to each vertical pin 41 at its projecting rod or shaft 42. This is specifically shown in FIG. 3 in which a pin body 50 is loosely engaged around the projecting rod 42 whose lower end is secured with a hold collar 51 so as to rotate but not raise the pin body 50. The pin body 50 is provided with a sprocket 52 which is, in turn, engaged with a chain 54 fixed on plate 53 secured on the upper surface of the stand 45. Thus, as the parison carrier pin 40 travels, the pin body 50 rotates around the projecting rod 42. When the sprocket 52 proceeds in the direction of an arrow 55 and engages the fixed chain 54 at each corner as shown in FIG. 5, excess forces may sometimes be exerted on them due to the interference between the roller 56 in the fixed chain 54 and the teeth of the sprocket 52 and, in order to avoid such disadvantages, a fixed coil spring 57 is provided one to several pitch locations before the roller 56. Since the teeth of the sprocket 52 at first abut on said spring and then revolve to such a phase as engages with the roller 56 moderately, the fixed chain 54 and the sprocket 52 can be meshed to each other smoothly. The upper portion of the pin body 50 is tapered and provide with grooves 58 at several positioning along the circumference of the tapered surface thereof. The upper end of the tapered portion has fixed thereto, a pin 59 and a steady rest collar 60 which is tapered for the easy feeding of parisons has several grooves on its circumference and is secured by a screw 61 to the tip of said pin as shown in the figure to prevent the rolling of a parison 1, hinder the thermal conduction by the reduction in contacting area and allow sufficient air to flow inside of the parison. The material used for the steady rest collar 60 and the upper portion of the pin main body 50 may be heat resistant and less thermal conductive material such as tetrafluoro ethylene resin and the like if required. The parisons are engaged to such parison carrier pins one by one, delivered by the chains 2, 2' through the furnace, and heated by the blast air. In the figure, feeding conveyor 62 which delivers parisons to the parison feeding apparatus and a rotary type feeder 63 which feeds the parisons to the chain conveyors are shown.

Figure 2:
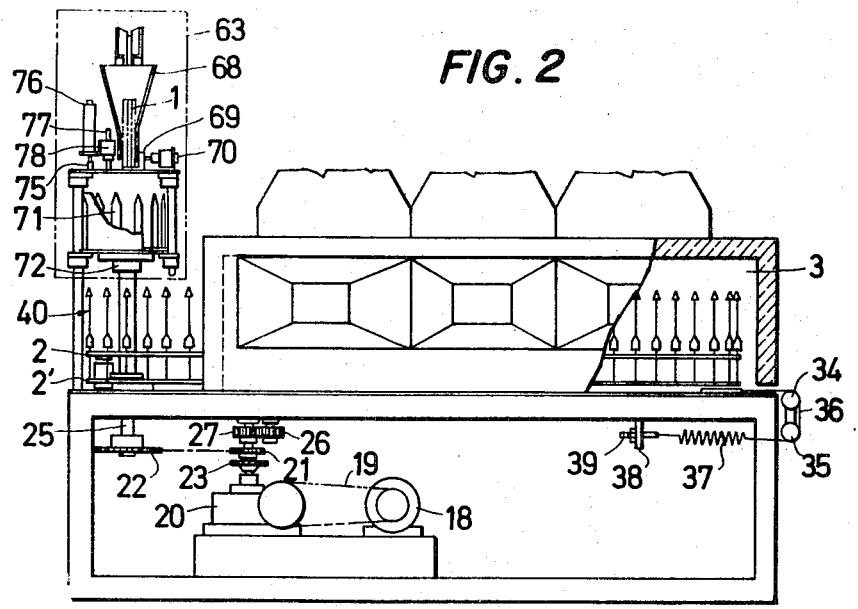
FIG. 2 is an elevational view of the apparatus shown in FIG. 1.
Figure 7:
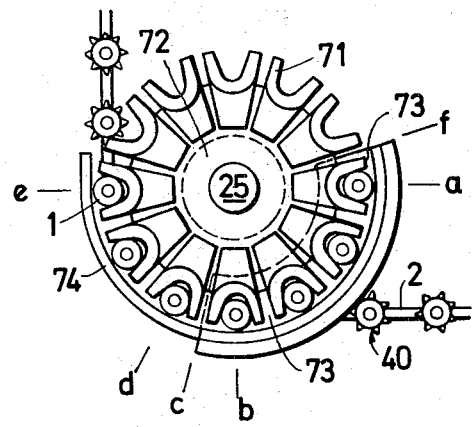
FIG. 7 is a view showing the detail of a rotary type parison feeder.
Figure 6:
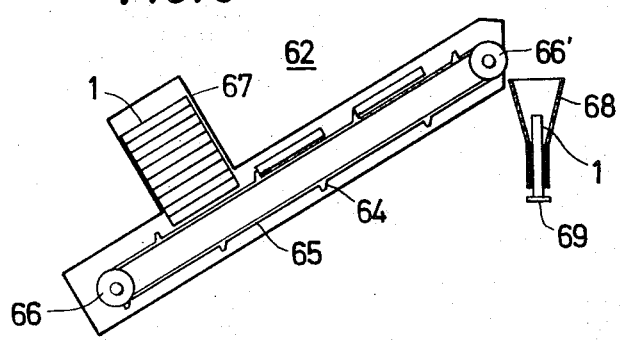
FIG. 6 is a view showing the detail of a parison feeding conveyor.

As shown in FIG. 6, the parison feeding conveyor 62 is composed by providing an endless chain 65 attached with parison push out nails 64 at equidistant positions between sprockets 66 and 66' and it is driven at a constant speed by the power supplied from the driving equipment appended to the furnace. The parisons 1 are automatically fed between the nails 64 of the parison feeder or they are taken out from the bottom of the hopper 67 secured to the conveyor hooked by the nail 64 one by one and delivered upwardly. When a parison 1 falls from the upper end of the chain to a hopper 68 of the rotary type parison feeder 63 to take vertical status, it is received by a shutter 69 thereunder. The shutter 69 closes and opens intermittently by switching the supply of the pressurized air to a pneumatic cylinder 70 (shown in FIG. 2) by means of electrical signals. Under the shutter 69, a disc 72 which includes guide frames 71 on its circumference as shown in FIGS. 2 and 7 is fixed to the same shaft 25 as that of the sprocket 4 which drives the delivery chains 2 and 2'. The guide frames 71 and the parison carrier pins 40 arranged on the upper and the lower circumferences are situated on the circle of the same pitch and they are aligned to each other with their respective positions from b to e as shown in FIG. 7.

A bottom plate 73 is secured between the guide frames 71 and parison carrier pins 40 at positions f to c shown in FIG. 7 and a fixed guide 74 is fixed at the outer periphery of the guide frame 71. Therefore, when one of the guide frames 71 that is continuously rotating at a low speed comes into a predetermined position, electrical signals are delivered via a limit switch from a separatedly provided timing cam to lower (or open) the shutter 69. Then, the parison fed thereto falls into the guide frame 71 and travels, with rotation, while supported by the bottom plate 73 and fixed guide 74 to the position c. Since the bottom plate ends to the position c, the parison again falls and engages with parison carrier pin 40 that is travelling, with rotation, in synchronization therewith. A pnumatic cylinder 76 having a push rod 75 at its tip is provided for pushing parisons to the parison carrier pins 40, so that the parison may not incompletely be inserted onto the parison receiving pin 40 due to burrs produced on the inner surface of the parison during its cutting. This pnumatic cylinder 76 is mounted to an arm 78 rotating around an axis 77 and always pulled by way of a spring 79. The timing for pushing to the parison is determined by the control of the supply of the pressurized air by deliverying electrical signals from the combination of a timing cam and a separately provided limit switch. More specifically, when a parison fed in a guide frame 71 arrives at a predetermined position d, the pnumatic cylinder 76 is actuated by means of electrical signals and causes the push rod 75 to push the parison to the parison carrier pin and immediately leave upward. Although the guide frame 71 is continuously rotating in the meantime, the push rod can follow the rotating movement of the guide frame while it moves up and down within the guide frame since the push rod is only pulled by the spring 79.

As can be seen from the foregoing embodiment, the parison delivery conveyor of this invention provides the following advantageous features as for the parison delivery apparatus in the heating furnace uniformly to heat the tubular parisons to be biaxially stretched:

1. Extremely simple structure can be provided for delivering and rotating parisons since it is so constructed that vertical pins are supported between two delivery chains and parison carrier pins are engaged thereto as shown in FIGS. 3 and 4.

2. Rotating teeth of the sprocket or gear attached to rotatable parison carrier pins and the linear teeth of the fixed chain, rack or the like can moderately be engaged with each other by providing a simple buffer rod such as a fixed coil spring as shown in FIG. 5.

3. The tension excerted on the delivery chain can be reduced by driving the chains with a plural of driving sprockets provided at several positions on the chains.

4. The tension exerted on each portion of the chains can be made uniform and the rolling of the chains caused by its sag can also be prevented since sprockets provided at several positions are pulled by wires being biased with springs.

5. On deliverying parisons from the parison feeding apparatus to the carrier pins of the parison delivery chain, the push rod actuates to ensure the engaging of the parisons to said carrier pins and, thus, the uniform heating for the parisons due to the rotation of the pins during delivery.

The parison delivery conveyor of this invention comprises the foregoing various features together and provides an apparatus with high performance that can uniformly heat the tubular parisons with high efficiency.

What is claimed is:

1. In a parison feeding and delivering apparatus for uniformly heating parisons by delivering the same from outside a parison heating furnace into a parallel passage arranged in said furnace and lying in a zig zag line making several turns at both sides of said furnace, and which comprises a parison delivery conveyor consisting of two horizontal endless chains situated one above the other and having carrier pins vertically mounted thereto, an apparatus provided outside of the heating furnace for feeding parisons to said delivery conveyor, and a plurality of sprockets for keeping said endless chains in driven or rotating status, the improvement wherein: a driving shaft of the parison feeding apparatus and sprockets on chain turning positions at one side of the furnace are driven by the same driving means, other sprockets on chain turning positions at the other side of the furnace are held by sliding plates supported by guide means, said sliding plates being biased from outside of the furnace by wires leading to springs, said parison carrier pins are freely rotatable around the axis of the vertical connection pins, and rotatable teeth for rotating the pins mounted on said parison carrier pins are engaged with fixed linear teeth during passage along the chains after being aligned with the phase of the fixed linear teeth by way of a fixed spring, which contacts the rotatable teeth prior to contact of said rotatable teeth with said fixed linear teeth.

2. The parison feeding and delivering apparatus of claim 1 wherein; said parison feeding apparatus further comprises, a rotary means which is connected to the same shaft of a sprocket of the parison delivery conveyors has a plural of parison guide frames at its periphery arranged in the same pitch relationship as that of the parison carrier pins, a parison feeding hopper which is secured above a position of the periphery of said rotary means, and a guide frame which is a part of the lower periphery of said rotary means and whose one end is substantially situated below said parison feeding hopper, each of the guide frame of said rotary means and a corresponding parison carrier pin thereunder which is delivered engages with a sprocket being interlocked and moved for a certain section on the upper and the lower circles in parallel with each other and of a same pitch, while parisons are being delivered from the parison feeding apparatus to the parison carrier pins.

3. The parison feeding and delivering apparatus of claim 1 wherein said parison carrier pins have mounted at the tip thereof, steady rest collars whose tips are tapered and provided with a plurality of grooves in the vertical direction on the tip periphery to permit free circulation of air axially of said parisons on both sides thereof.

4. The parison feeding and deliverying apparatus of claim 2 wherein said parison feeding apparatus further comprises a push rod for pushing a parison to engage it with a parison carrier pin on delivery of the parison from a parison guide frame to the parison carrier pin.

* * * * *